United States Patent
Bondurant et al.

(10) Patent No.: US 10,754,821 B2
(45) Date of Patent: Aug. 25, 2020

(54) VIRTUAL FILE SERVER

(71) Applicant: HEWLETT PACKARD ENTERPRISE DEVELOPMENT LP, Houston, TX (US)

(72) Inventors: Matthew David Bondurant, Boulder, CO (US); Dinesh Venkatesh, Andover, MA (US); Kishore Kumar Muppirala, Bangalore (IN); Sasha Alexander Epstein, Andover, MA (US); Ronald John Luman, Lewis Center, OH (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 213 days.

(21) Appl. No.: 15/326,987

(22) PCT Filed: Nov. 18, 2014

(86) PCT No.: PCT/US2014/066017
§ 371 (c)(1),
(2) Date: Jan. 17, 2017

(87) PCT Pub. No.: WO2016/018446
PCT Pub. Date: Feb. 4, 2016

(65) Prior Publication Data
US 2017/0206207 A1    Jul. 20, 2017

(30) Foreign Application Priority Data

Jul. 29, 2014 (IN) .......................... 3695/CHE/2014

(51) Int. Cl.
*G06F 16/11* (2019.01)
*G06F 16/182* (2019.01)
*G06F 16/188* (2019.01)

(52) U.S. Cl.
CPC .......... *G06F 16/119* (2019.01); *G06F 16/183* (2019.01); *G06F 16/188* (2019.01)

(58) Field of Classification Search
CPC ......... G06F 17/30079; G06F 17/30203; G06F 17/30233; G06F 16/188; G06F 16/183; G06F 16/119

(Continued)

(56) References Cited

U.S. PATENT DOCUMENTS 7,296,041 B2   11/2007 Nakatani et al.
7,383,463 B2    6/2008 Hayden et al.
(Continued)

FOREIGN PATENT DOCUMENTS

WO     20091145764 A1   12/2009

OTHER PUBLICATIONS

Huang, J., "Migrate Your File Server to the Cloud," (Web Page), Jun. 26, 2012, 7 pages available at http://gladinet.blogspot.in/2012/06/migrate-your-file-server-to-cloud.html.
International Search Report and Written Opinion received in PCT Application No. PCT/US2014/066017, dated Apr. 29, 2015, 11 pages.

(Continued)

*Primary Examiner* — Md I Uddin
(74) *Attorney, Agent, or Firm* — Hewlett Packard Enterprise Patent Department (57) ABSTRACT

The present disclosure provides a method and a system for migrating a virtual file server. In an example of a method, a virtual file server is migrated from a first storage to a second storage, wherein the virtual file server comprises a server layer and a data layer. Identity information is retrieved from the server layer from the server layer for the second storage. The identity information is updated so instantiation of the virtual file server on the second storage appears the same as on the first storage.

20 Claims, 5 Drawing Sheets

(58) Field of Classification Search
USPC .................................. 707/654, 823, 827, 610
See application file for complete search history.

(56) References Cited

U.S. PATENT DOCUMENTS

| | | | |
|---|---|---|---|
| 7,769,720 | B2 | 8/2010 | Armington |
| 7,877,511 | B1 * | 1/2011 | Berger .................... H04L 67/16 709/242 |
| 8,006,056 | B2 | 8/2011 | Voigt et al. |
| 8,099,497 | B2 | 1/2012 | Melnikov |
| 8,099,758 | B2 | 1/2012 | Schaefer et al. |
| 8,166,478 | B2 | 4/2012 | Jess et al. |
| 8,799,894 | B2 | 8/2014 | Lunawat et al. |
| 8,910,156 | B1 | 12/2014 | Kenchammana-Hosekote et al. |
| 2007/0220121 | A1 | 9/2007 | Suwarna |
| 2008/0148295 | A1 | 6/2008 | Freimuth et al. |
| 2009/0089781 | A1 * | 4/2009 | Shingai ................. G06F 9/5088 718/1 |
| 2010/0154054 | A1 | 6/2010 | Beck |
| 2012/0166389 | A1 | 6/2012 | Shiozawa |
| 2012/0254140 | A1 | 10/2012 | Srinivasaraghavan et al. |
| 2012/0278450 | A1 | 11/2012 | Soltis |
| 2014/0143391 | A1 | 5/2014 | Tanigawa et al. |
| 2014/0165062 | A1 | 6/2014 | Buragohain et al. |
| 2014/0229944 | A1 | 8/2014 | Wang et al. |

OTHER PUBLICATIONS

Nexenta Systems, Inc., "SuperMicro Fat Twin / NexentaConnect for VSAN Solutions Brief," (Research Paper), Oct. 10, 2014, 2 pages.

NetApp, Inc., "How SnapMirror works," May 2013, <https://library.netapp.com/ecmdocs/ECMP1196991/html/GUID-98E2BBA2-2A4F-4261-A390-9A712AB78761.html>.

NetApp, Inc., "What MultiStore is," Apr. 2013, <https://library.netapp.com/ecmdocs/ECMP1155585/html/GUID-8E0309D2-E9FD-4993-9E8F-6417CF186DAF.html>.

NetApp, Inc., "Introduction to MultiStore and vFiler units (7-Mode environments only)," Mar. 2015, <https://library.netapp.com/ecmdocs/ECMP1608423/html/GUID-AC776453-E3CA-4509-BEAD-3DCDD8A46FCA.html>.

VMware, Inc., "VMware VMotion," Product Datasheet, 2007, <http://www.vmware.com/pdf/vmotion_datasheet.pdf>.

International Search Report and Written Opinion received for PCT Application No. PCT/US2015/013813, dated Oct. 29, 2015, 8 pages.

International Preliminary Report on Patentability received for PCT Patent Application No. PCT/US2014/066017, dated Feb. 9, 2017, 8 pages.

International Preliminary Report on Patentability received for PCT Application No. PCT/US2015/013813, dated Aug. 10, 2017, 7 pages.

* cited by examiner

VIRTUAL FILE SERVER

BACKGROUND

A file system is used in computing for controlling the storage and retrieval of data. In particular, file systems are used to identify and separate data into individual units, and each unit is considered a "file" of the system. The overall file system is the logic and structure used to locate, store, retrieve, and manage groups of information or files. A file server can be a computer used to provide the location for shared disk access, which is the shared storage of computer files, and to enable the retrieval of data while computations are made by computers on the network. A virtual file server consists of a virtualized device configured to store any means of computer files and information. These computer systems and data identification and retrieval technologies are used throughout many different businesses and for a myriad of applications.

BRIEF DESCRIPTION OF THE DRAWINGS

Certain examples are described in the following detailed description and in reference to the drawings, in which.

DETAILED DESCRIPTION OF SPECIFIC EXAMPLES

In computing, block replication is a technique used to ensure consistency between resources like hardware and software, and to improve the sharing and accessibility of information and the reliability those processes. Server virtualization for computing systems allows software to convert a physical server into multiple virtual machines or virtual servers. Through server virtualization, a virtual server acts as a physical computing device that can run its own operating system.

The concept of multi-tenancy is the use of a single object of software that is run on a server and serves multiple client entities or tenants. The architecture of multitenant applications is configured to partition data and configuration information virtually, with each tenant receiving its own virtualized application. A detachable self-contained file server is described herein that adds to these existing computing techniques with new methods. The technology herein combines block and file replication techniques with concepts from server virtualization to create a self-contained file server that can easily migrate from one storage array to another.

Virtualization of servers and a multitenant architecture saves physical computing space, and can provide more widespread access to information. File servers may provide the location for shared disk access. A challenge is to provide a file server solution that could provide multi-tenancy features in order to facilitate use, for example, in larger businesses with centralized information technology resources serving many departments, or a in a service provider environment for a cloud file server solution. A virtualization for a layered solution leveraging server can be used to provide a tenant container where each tenant is supported by one or more virtual machines (VMs) serving as a gateway to the underlying storage. However, scaling to a larger number of tenants requires significant computing resources in order to support the VMs, especially when there are hundreds or thousands of supported VMs.

Examples discussed herein provide a low cost and effective disaster recovery (DR) solution for a file server product. Generally, the file system is tightly coupled to the clustering software running on the file server gateways, making it necessary to boot the gateways from volumes on the storage arrays and replicate those boot volumes along with the user data to the second site. In the case of a failover event, a second set of physical file server gateways is booted off the replicated boot volumes from the first site, with ownership of the replicated user data transferred to the second site as well. Some scripts would be run on the servers to adjust for changes in hardware between sites. This leverages a cluster of physical file server gateways at one site layered on block storage, and replicates the data to a second site using block replication features of the array. This setup is difficult to maintain and does not practicably scale in a many-to-one replication scenario that might be found in a remote-office/branch-office use case.

In examples disclosed herein, file services technology are used in combination with block storage technology of storage arrays. A multi-protocol array can be used to deliver block storage, file storage, and object storage. For block storage, Fibre Channel (FC)/Internet Small Computer System Interface (iSCSI)/Fibre Channel Over Internet (FCoE) attachment can be utilized. For file storage, Server Message Block (SMB)/Network File System (NFS)/Hypertext Transfer Protocol (HTTP)/File Transfer Protocol (FTP) over Ethernet can be utilized. The examples herein provide a DR feature set similar to a remote copy for a storage array for block storage volumes, but applied to both the file and object data of the combined product. Examples provide a solution for file server consolidation, file server multi-tenancy, and file server business continuity.

Some examples described herein implement a method for transparently migrating a virtual file server, including replicating blocks of the virtual file server between a first storage and a second storage, wherein the virtual file server comprises a server layer and a data layer. The method includes migrating the virtual file server across a storage cluster boundary from the first storage to the second storage. The method includes retrieving identity information from the server layer for the second storage. The method also includes updating the identity information so the instantiation of the virtual file server on the second storage appears the same as on the first storage.

An example described herein uses a detached data store, including a storage region, to house a virtual file server. The virtual file server includes a server layer and a data store layer. The server layer includes server identity information. The data store layer includes a drive of the storage region. The virtual file server is detachable from the storage region, and the virtual file server is migrated to a second storage region.

Figure 1:
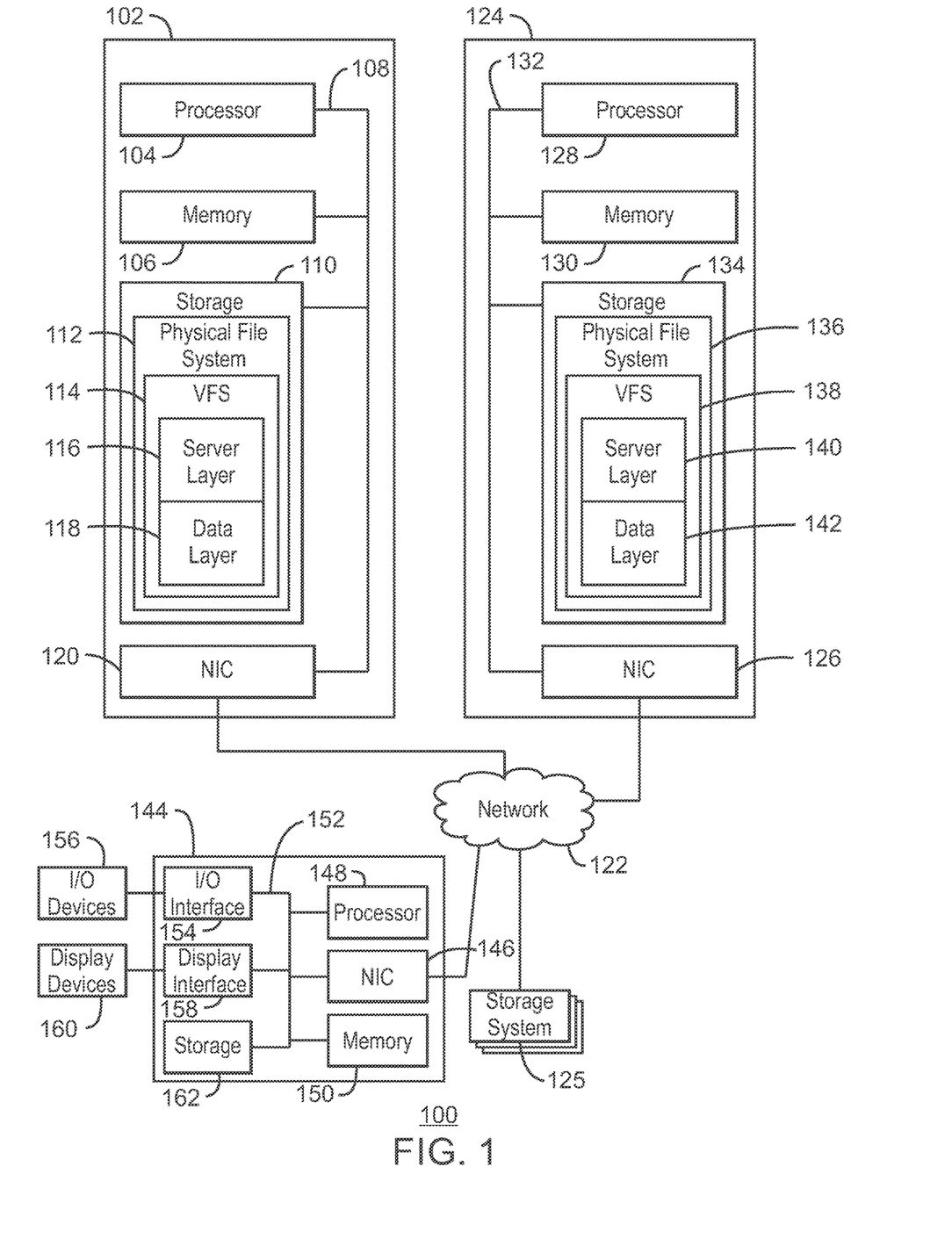
FIG. 1 is an example block diagram of a computer system for block replication, virtualization, and migration of a file server.

FIG. 1 is an example block diagram of a computer system 100 for block replication, virtualization, and migration of a file server. A computer device 102 may process and store a file system. The computer device 102 may be, for example, a laptop computer, a desktop computer, a smartphone, or a computing tablet, among others. The computer device 102 may include a processor 104 that is configured to execute stored instructions, as well as a memory device 106 that stores instructions that are executable by the processor 104. The processor 104 can be a single core processor, a dual-core processor, a multi-core processor, a computing cluster, or the like. The processor 104 may be coupled to the memory device 106 by a bus 108 where the bus 108 may be a communication system that transfers data between various components of the computer device 102. In embodiments, the bus 108 may be a PCI, ISA, PCI-Express, HyperTransport®, NuBus, or the like.

The memory device 106 can include random access memory (RAM), e.g., SRAM, DRAM, zero capacitor RAM, eDRAM, EDO RAM, DDR RAM, RRAM, PRAM, read only memory (ROM), e.g, Mask ROM, PROM, EPROM, EEPROM, flash memory, or any other suitable memory systems. The computer device 100 may also include a storage device 110. The storage device 110 may include non-volatile storage devices, such as a solid-state drive, a hard drive, an optical drive, a flash drive, an array of drives, or any combinations thereof. The storage device 110 may include a number of modules configured to provide the computer device 102 with block replication and migration functionality. The storage device 110 includes a physical file system 112. The physical file system 112 includes file system information used to identify and separate data into individual units, and includes the logic and structure used to locate, store, retrieve, and manage files. The physical file system 112 includes virtual file server (VFS) 114. The VFS 114 will configure a name, network address, and authentication mechanism for access to the VFS 114 or physical file system 112. The VFS 114 includes server layer 116 and data layer 118. The server layer 116 is where the concepts of server identity are bound, such as name, IP address, and authentication mechanism, for example. The data layer 118 corresponds to a storage drive, for example, the C and D drive in a Windows file server. The configuration of file sharing is bound to the data layer 118, and a directory can be shared at the root or below within the data layer 118.

A network interface controller (NIC) 120 may also be linked to the processor 104. The NIC 126 may link the computer device 102 to the network 122 through a physical connection, or through a wireless connection. The network 122 can connect to a separate computing device 124 through another NIC 126, or a similar network connection. The network 122 allows the computer device 124 to network with resources, such as the Internet, printers, fax machines, email, instant messaging applications, and with files located on the other computing device 102, or storage servers 125, for example. Computer device 124 includes processor 128, memory 130, and bus 132 that are described as above with respect to processor 104, memory 106, and bus 108. Computer device 124 includes storage 134 to store physical file system 136. The physical file system 136 includes a virtual file server (VFS) 138 that is a replica of the VFS 114 on physical file system 112. The VFS 114 can be virtually detached from computer device 104, migrated to computer device 124, and configured as VFS 138. In some examples, the physical file system 112 can be disconnected from computer device 102 and moved to another computer device, e.g., computer device 124 to migrate the VFS 114 as VFS 138. The sever layer 140 and data layer 142 of VFS 138 correspond to the server layer 116 and data layer 118 of VFS 114. The virtualization of the physical file system 112 on VFS 114 and the replication of the VFS 114 to the VFS 138 on physical file system 136 provide a mechanism for disaster recovery (DR) without using dedicated hardware on standby at the target site.

Another computer device 144 can be connected to computer devices 102 and 124 through the network 122 through NIC 146. Computer device 144 can include processor 148, memory 150, and bus 152 that are described as above with respect to processor 104, memory 106, and bus 108. The processor 148 may be connected through the bus 152 to an input/output (I/O) device interface 154 configured to connect the computer device 144 to one or more I/O devices 156. The I/O devices 156 may include, for example, a keyboard, a mouse, or a pointing device, wherein the pointing device may include a touchpad or a touchscreen, among others. The I/O devices 156 may be built-in components of the computer device 144, or located externally to the computer device 144. The processor 148 may also be linked through the bus 152 to a display interface 158 configured to connect the computer device 144 to display devices 160. A display device 160 may be a built-in component of the computer device 144, or connected externally to the computer device 144. The display device 160 may also include a display screen of a smartphone, a computing tablet, a computer monitor, a television, or a projector, among others. Computer device 144 also includes storage 162 to store data and instructions. A user may interact with computer device 144 and configure or initiate the block replication and virtualization of a file server located on another computer device, for example VFS 114 on a first storage 110 associated with computer device 102 is transparently migrated to VFS 138 on a second storage 134 associated with computer device 124.

The block diagram of FIG. 1 is not intended to indicate that the computer system 100 is to include all of the components shown in FIG. 1. Further, any number of additional components may be included within the computer system 100, depending on the details of the specific implementation of the described herein. For example, a virtual machine (VM) can be utilized instead of computer device 144 by a user to configure or initiate file server migration. Further, the components discussed are not limited to the functionalities mentioned, but the functions could be done in different places, or by different modules, if at all.

Figure 2:
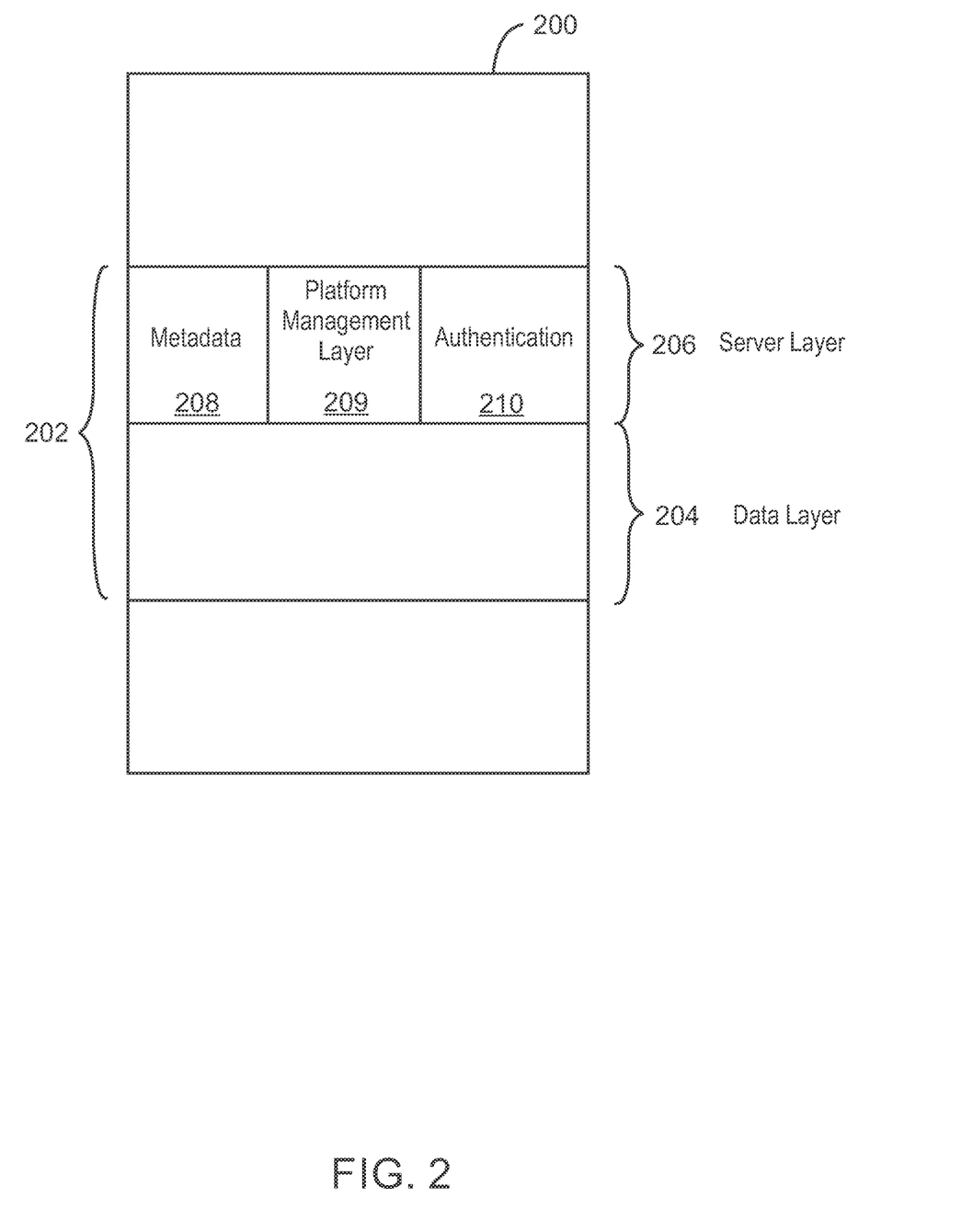
FIG. 2 is a block diagram of a storage area on an example file system.

FIG. 2 is a block diagram of a storage region in an example file system 200. The file system 200 is stored by some form of storage, for example, a storage device or storage array. The file system 200 is used to manage access to the content of files on the storage, as well as the metadata about those files. The file system 200 can automatically provision a set of volumes to meet a requested size and create a virtual file server (VFS) 202. A file store (not shown) within the VFS 202 can be created, and one or more shares can be created using SMB/NFS/HTTP of folders within the file store.

In some examples, a file system 200 is created based on porting of an ADVFS file system from HP-UX to Linux, for example. This can include a volume manager that can aggregate multiple underlying block devices into a domain. The process of domain discovery allows information about the contained file systems to be determined and imported into a cluster configuration. In some examples, a logical file system can be layered on top of the physical file system 200, and can be used to implement a scale-out file system. Scale-out storage is a networked-attached storage architecture where disk space can be expanded, even if new target drives exist on a separate storage array. The logical file system provides policy containers leveraged to store relevant policy information that described the identity of the VFS 202. Virtualization of file servers presents a logical space for data storage, and controls the process of mapping the logical space to the actual physical location of the data.

The VFS 202 includes plugins to implement different pieces of functionality to manage the system. These plugins include a data policy layer 204, and a server policy layer 206, which are the two primary layers of policy containers within the file system 200. The VFS 202 can include a platform management layer 209 for clustering and manageability. The platform management layer 209 can provide an infrastructure for implementing policy and manageability, in addition to management of cluster formation and maintenance. The platform management layer 209 is instantiated per file services cluster and is not replicated across sites, for example, from one array to another.

Instead of capturing the networking, authentication, and file sharing policy in a cluster level file store, these policies are now stored within the file system itself using the policy containers. Additional plugins (not shown) can be used to implement value added services such as, for example, antivirus, quotas, and snapshots. The services will have associated policies stored in the VFS 202 on either the data policy layer 204, or the server policy layer 206, and not in a platform management store, or the like. The data policy later 204 corresponds to a C or D drive in a Windows file server, or the like, and is where the configuration of file sharing is bound.

The server policy layer 206 includes metadata 208 and authentication data 210, and is where concepts of server identity are bound, such as name, IP address, and particular authentication mechanism. By storing the file sharing information within the server layer 206 rather than in a cluster level file store, the sharing information is automatically recovered when the virtual file server 202 is migrated to a separate storage cluster.

A feature of the file system 200 of FIG. 2 is to provide a file server solution that incorporates multi-tenancy features. The inclusion of efficient multi-tenancy features facilitates use of the current technology in larger companies with centralized IT serving many departments, as well as in a service provider environment for a cloud file server solution, for example. A technology like a 3PAR™ array, for example, including a VM running on each 3PAR™ controller node can be used to implement the techniques described herein.

A feature leveraged by the file system 200 is the block replication of a VFS 202 between arrays, where options for both synchronous and asynchronous replication are available. Block replication is for replicating the VFS 202 making up a file system from one array to another so the file system 200 can be presented to a file services cluster (not shown) on the remote array without any a priori knowledge of the file system 200. Another included feature is the creation of block snapshots to provide a protection mechanism against corruption of the file system 200 that may not be recoverable through file based snapshots. Another included feature is technology that allows for migration of VFS 202 transparently from one array to another. Such file server migration techniques can be used for cases such as, for example, load balancing, or retirement of an array.

The block diagram of FIG. 2 is not intended to indicate that the file system 200 is to include all of the components shown in FIG. 2. Further, any number of additional components may be included within the file system 200, depending on the details of the specific implementation of the described herein. For example, the components discussed are not limited to the functionalities mentioned, but the functions could be done in different places, or by different components, if at all.

Figure 3:
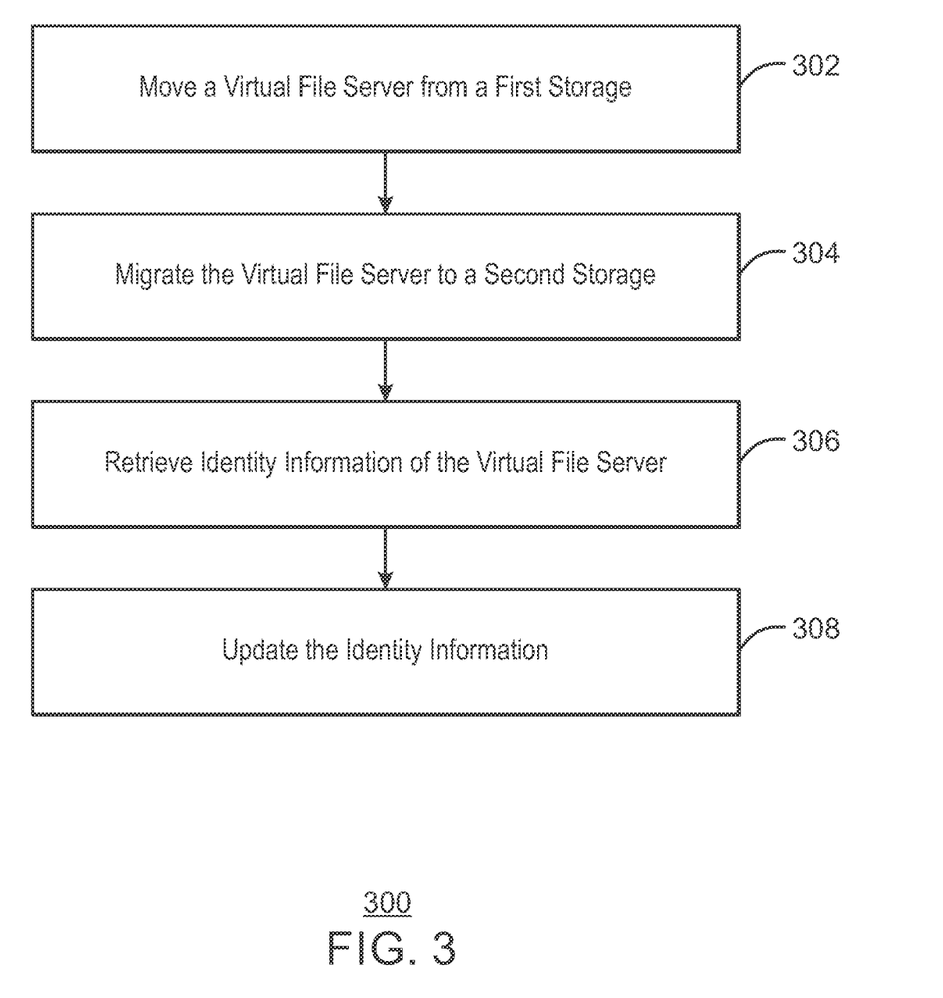
FIG. 3 is a process flow diagram of an example method for creating a detachable file server.

FIG. 3 is a process flow diagram of an example method 300 for creating a migratable file server. The method 300 may be implemented, for example, by the computer devices 102, 124 described with respect to FIG. 1. In particular, the computer device can be configured to permit the block replication, file server virtualization and migration techniques that are disclosed herein. The method 300 begins at block 302.

At block 302, a virtual file server is moved from a first storage array. The movement of the VFS can be physically performed, for example, by disconnecting a drive from the first storage array. In some examples, the VFS can be virtually moved by copying of the storage blocks that make up the VFS.

A typical file server is a computer attached to a network that is to provide a location for shared disk access that can be accessed by other computers that are attached to the same network. File servers are related to storage and management of data, and storage virtualization is to enable better functionality and advanced features within and across storage systems, including a number of disk drives or a disk array. Block virtualization refers to the separation of logical storage from physical storage so that logical storage may be accessed without respect to the physical storage or a heterogeneous structure. Virtualization of storage can achieve location independence by separating or abstracting the physical location of the data. For storage that is virtualized, replication is implemented above the software or device that is performing the virtualization.

At block 304, the virtual file server is migrated to a second storage array. The migration may be performed by physically connecting a drive that has been disconnected from a first storage array to a second storage array. The migration, as well as the replication, of the virtual file server contained in this physical file system is transparent so files are able to be moved without another client having access to the files knowing. The replication and migration of the virtual file server supports the scalability and multi-tenancy features described herein. In another example, the blocks that have been copied from a first storage array are written into the second storage array.

At block 306, identity information for the virtual file server is retrieved at the second storage array. After being moved or replicated and before receiving the identity information, the file system is unmounted from the first storage array using the virtual file server and an ownership change for the virtual file server is initiated to give the second storage array priority.

At block 308, the identity information is updated at the second storage array. VMs on storage clusters of the second storage array will detect the new virtual file servers and read the metadata from the virtual file servers as part of a domain discovery. Through this domain discovery, basic information about the file system contained on the virtual file server will be provided, and a mount operation can be performed on the virtual file server and file system to the second storage array.

Figure 4:
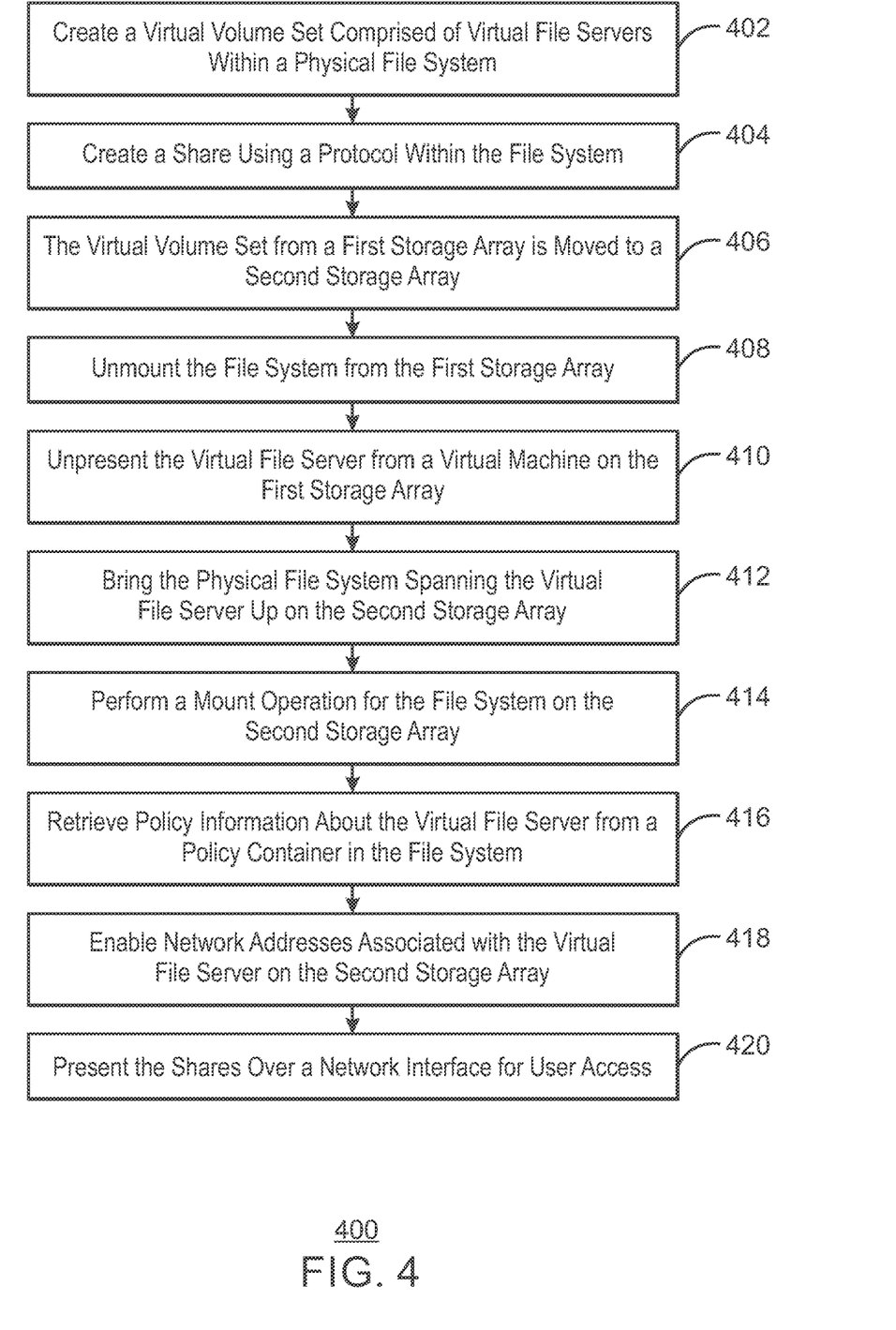
FIG. 4 is a process flow diagram of an example method for migrating a detachable file server between storage arrays.

Implementation of method 300 results in a multiprotocol array, delivering FC/iSCSI/FCoE attachment for block storage, SMB/NFS/HTTP/FTP over Ethernet for file storage, and, for example, OpenStack Swift™ (over HTTP), or the like, for object storage. The techniques described herein deliver a DR feature set similar to that used for block storage volumes, but applied to the file and object data that are being added into the combined product. The techniques disclosed simplify the DR scenario by decoupling the file server configuration from the storage cluster that is hosting the file server. Furthermore, this method 300 and method 400 below efficiently allows multi-tenancy without requiring dedicated containers, like a VM, for each tenant. Finally, the techniques herein facilitate balancing load across hardware resources by allowing a file server to migrate across physical cluster boundaries.

The process flow diagram in FIG. 3 is not intended to indicate that the method 300 is to include all of the components shown in FIG. 3. Further, the method 300 may include fewer or more steps than what is shown, depending on the details of the specific implementation.

FIG. 4 is a process flow diagram of an example method 400 for migrating a detachable file server between storage arrays. Method 400 embeds file server identity into a policy container within a virtual file server within the file system, and makes the file system easily detachable from the original host environment for the file system. Block replication techniques are able to effectively move, or replicate and migrate virtual file servers between physical hosting environments without needing to worry about replicating an entire operating system, as is typical for previous solutions. The method 400 begins at block 402.

At block 402, a virtual volume set is created and comprised of virtual file servers within a physical file system. The virtual volume set will automatically provision to meet a requested size virtual file server or number of virtual file servers. At block 404, a share is created using a protocol within the file system. The protocol is typically related to file storage and can be, for example, Server Message Block (SMB), (Network File System) NFS, or HTTP. At block 406, the virtual volume set is either physically moved or is replicated from a first storage array to a second storage array. Method 400 does not rely on a file system being tightly coupled to clustering software running on gateways. This method 400 avoids the possibility of some scripts needing to be run on servers to adjust for issues where the OS was expecting to have one set of hardware attached and instead different hardware was present. It is therefore not necessary to boot the gateways from volumes on the first storage array and replicate those boot volumes along with the user data to the second storage array, thus permitting the techniques discussed herein to be more efficient and cost effective.

At block 408, the file system is unmounted from the first storage array. The unmount operation of the file system is triggered by the initiation of an ownership change for the virtual volume set so that an array other than the host array becomes designated as the primary array. The unmount operation includes disabling the network addresses owned by the virtual file server. After the unmount operation completes, an application programming interface (API) call will be made to remove the record of the file server from the platform management store of the first array. This will be done without actually performing any operation on the virtual volumes. At block 410, the virtual file server is unpresented from a VM running on the first storage array. At this point, the first storage array is ready to relinquish ownership of the virtual file server.

At block 412, the physical file system that spans the virtual file server is brought-up on the second storage array. The second storage array now owns the virtual file server and a storage discovery operation can be requested and performed. The VMs will detect the new physical file system and the virtual file server associated with it and the virtual volumes therein and read related metadata as part of domain discovery, thereby providing basic information about the file system contained on the virtual volumes. A request is then made to import the file system into the cluster, at which point a record of the file system is made in the platform management store on the second storage array. At block 414, a mount operation can now be performed for the file system on the second storage array.

At block 416, policy information about the virtual file server is retrieved from a policy container in the file system. The policy information is retrieved during the mount of the file system on the second storage array. At block 418, the network addresses associated with the virtual file server on the second storage array are enabled. At block 420, the shares are presented over a network interface for user access to connected devices throughout the network. A user may configure the file server replication and migration from a computer device that is unrelated to the first or second storage arrays, and thereby remotely initiate the method 400 described herein. From the perspective of the client of the file server, the instantiation of the virtual file server on the second storage array looks the same as it did on the first storage array.

The process flow diagram in FIG. 4 is not intended to indicate that the method 400 is to include all of the components shown in FIG. 4. Further, the method 400 may include fewer or more steps than what is shown, depending on the details of the specific implementation.

Figure 5:
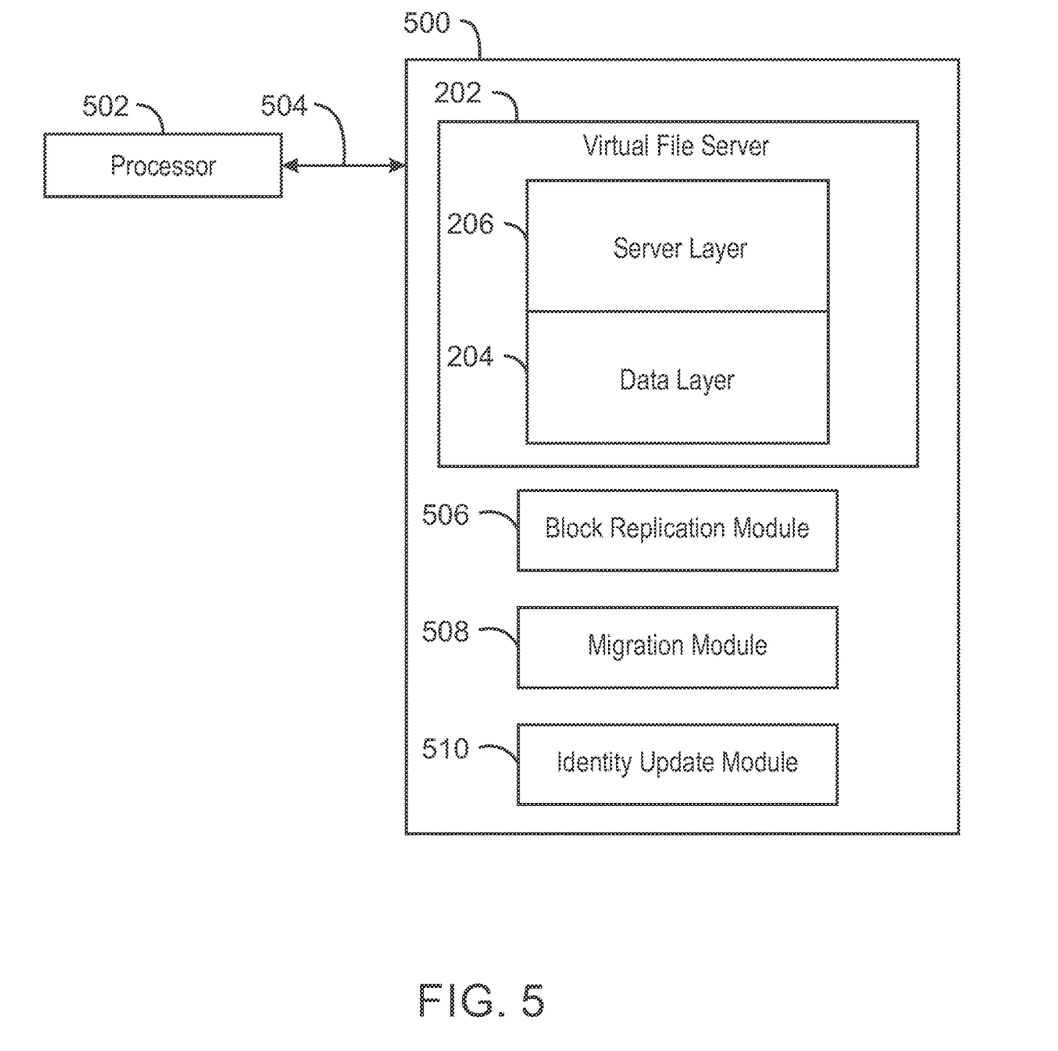
FIG. 5 is an example block diagram showing a non-transitory, computer-readable media that holds code that enables the migration of a virtual file server.

FIG. 5 is an example block diagram showing a non-transitory, computer-readable media 500 that holds code to enable file server virtualization and migration. The computer-readable media 500 may be accessed by a processor 502 over a system bus 504. The code may direct the processor 502 to perform the steps of the current method as described with respect to FIGS. 3 and 4. For example, the VFS 202, including data layer 204 and server layer 206, described as above with respect to FIG. 2, can be stored on the computer-readable media 500. The VFS 202 is configured to be migrated from computer-readable media 500 to some other storage, such as a storage array or storage cluster.

A block replication module 506 is configured to provide synchronous or asynchronous replication between storage arrays for virtual volumes, which make up a file system, and ultimately VFS 202. The block replication module 506 allows the file system to be presented to a file service cluster on a remote storage array without the array having a priori knowledge of the file system. The concept of the file server identity is embedded into a policy container of the VFS 202, specifically the server layer 206 within the file system and the file system itself, is then easily separable from the host environment. The block replication module 506, along with the migration module 508, allow a set of VFS 202 to migrate between physical hosting environments without the need to replicate an entire boot drive or operating system, and while still providing an effective DR solution for a file server product.

The migration module 508 transparently migrates the VFS 202 so files are able to be moved over the network without another client device, of a plurality of client devices, knowing. The replication and migration of the virtual file server supports multi-tenancy without the need for each tenant being supported by its own VM. The migration module 508 is to initiate an ownership change for a VFS 202, designating a second storage as primary. The migration module 506 allows the VFS 202 to unmount from a host storage. The migration module 506 can remove the record of the file system from the host storage without modification of virtual volumes or the VFS 202. The migration module 508 is also to present the newly owned VFS 202 to VMs on the second storage. The VMs will detect the new VFS 202 and read the metadata from the VFS 202, thereby allowing the VMs to access the underlying file system associated with the VFS 202. The migration module 508 is also to import the file system to the second storage, and make a record of the file system on a platform management store of the second storage. The migration module 508 ultimately mounts the file system through the virtual file server to the second storage.

An identity update module 510 is configured to complete the mount of the file system on the second storage by, for example, retrieving policy information from the server layer 206 of the VFS 202. Network addresses associated with the file system are enabled by the identity update module 510. Shares are then presented over various network interfaces for user data access throughout a network. The identity update module 510, as well as the block replication module 506 and migration module 508, are to operate transparently to client devices on the network, such that instantiation of the VFS 202 on the second storage appears the same as on the host storage environment.

The block diagram of FIG. 5 is not intended to indicate that the computer-readable media 500 is to include all of the components or modules shown in FIG. 5. Further, any number of additional components may be included within the computer-readable media 500, depending on the details of the specific implementation of the file server virtualization and migration techniques described herein.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the present techniques.

What is claimed is:

1. A method for transparently migrating a virtual file server, comprising:
   creating a virtual volume set that includes a virtual file server within a physical file system of a first storage device of a first computing device associated with a first storage cluster, wherein the virtual volume set is automatically provisioned to meet a requested size and the virtual file server provides multi-tenancy without requiring dedicated containers for each tenant;
   detaching the virtual file server from the first storage device, wherein the virtual file server comprises a server layer and a data layer and is decoupled from an operating system of the first computing device;
   migrating the virtual file server across a storage cluster boundary by transparently migrating the virtual file server from the first storage device to a second storage device of a second computing device associated with a second storage cluster;
   retrieving, by a processor of the second computing device, server identity information from the server layer for the second storage device, the server identity information including at least an Internet Protocol address of the virtual file server and being embedded in a policy container within the server layer of the virtual file server, wherein the server identity information comprises metadata and authentication information; and
   instantiating, by the processor, the virtual file server within a physical file system of the second storage device, including making the virtual file server have a same appearance as when previously attached with the first storage device by updating the server identity information, the virtual file server being decoupled from an operating system of the second computing device.

2. The method of claim 1, wherein said migrating the virtual file server is performed by:
   detaching the physical file system from the first storage device; and
   attaching the physical file system to the second storage device.

3. The method of claim 1, wherein said migrating the virtual file server is performed by replicating blocks of the virtual file server from the first storage device to the second storage device.

4. The method of claim 1, wherein the metadata and authentication information define a configuration of the virtual file server as the virtual file server appears to the operating system of the first computing device.

5. The method of claim 1, further comprising binding file sharing configuration to the data layer of the virtual file server.

6. The method of claim 1, wherein said migrating the virtual file server facilitates load balancing between storage arrays.

7. The method of claim 1, further comprising creating block snapshots.

8. The method of claim 1, wherein the second storage device comprises a second storage array and wherein the second storage array provides block storage over a first protocol, file storage over a second protocol, and object storage over a third protocol.

9. The method of claim 1, wherein the virtual volume set comprises a plurality of virtual file servers and wherein said migrating the virtual file server comprises migrating the virtual volume set.

10. The method of claim 1, wherein one or both of the first storage device and the second storage device comprise a multi-protocol storage array of flash drives that provides block storage over a first protocol, file storage over a second protocol, and object storage over a third protocol.

11. The method of claim 1, wherein a virtual machine on the second storage cluster detects the virtual file server within the physical file system of the second storage device and reads metadata from the server identity information to access an underlying file system associated with the virtual file server.

12. A system comprising:
   a processing resource; and
   a non-transitory computer-readable medium, coupled to the processing resource, having stored therein instructions that when executed by the processing resource cause the processing resource to:
   create a virtual volume set that includes a virtual file server within a physical file system of a first storage device of a first computing device associated with a first storage cluster, wherein the virtual volume set is automatically provisioned to meet a requested size and the virtual file server provides multi-tenancy without requiring dedicated containers for each tenant;
   detach the virtual file server from the first storage device, wherein the virtual file server comprises a server layer and a data layer and is decoupled from an operating system of the first computing device;
   migrate the virtual file server across a storage cluster boundary by transparently migrating the virtual file server from the first storage device to a second storage device of a second computing device associated with a second storage cluster;

retrieve server identity information from the server layer for the second storage device, the server identity information including at least an Internet Protocol address of the virtual file server and being embedded in a policy container within the server layer of the virtual file server, wherein the server identity information comprises metadata and authentication information; and instantiate the virtual file server within a physical file system of the second storage device, including making the virtual file server have a same appearance as when previously attached with the first storage device by updating the server identity information, the virtual file server being decoupled from an operating system of the second computing device.

13. The system of claim 12, wherein the virtual file server is migrated by:

replicating blocks of the virtual file server from the first storage device to the second storage device; or migrating the virtual volume set.

14. The system of claim 12, wherein the metadata and authentication information define a configuration of the virtual file server as the virtual file server appears to the operating system of the first computing device.

15. The system of claim 12, wherein the instructions further cause the processing resource to bind file sharing configuration to the data layer of the virtual file server.

16. The system of claim 12, wherein one or both of the first storage device and the second storage device comprise a multi-protocol storage array of flash drives that provides block storage over a first protocol, file storage over a second protocol, and object storage over a third protocol.

17. A non-transitory, machine-readable medium comprising instructions that when executed by a processing resource cause the processing resource to:

create a virtual volume set that includes a virtual file server within a physical file system of a first storage device of a first computing device associated with a first storage cluster, wherein the virtual volume set is automatically provisioned to meet a requested size and the virtual file server provides multi-tenancy without requiring dedicated containers for each tenant;

detach the virtual file server from the first storage device, wherein the virtual file server comprises a server layer and a data layer and is decoupled from an operating system of the first computing device;

migrate the virtual file server across a storage cluster boundary by transparently migrating the virtual file server from the first storage device to a second storage device of a second computing device associated with a second storage cluster;

retrieve server identity information from the server layer for the second storage device, the server identity information including at least an Internet Protocol address of the virtual file server and being embedded in a policy container within the server layer of the virtual file server, wherein the server identity information comprises metadata and authentication information; and instantiate the virtual file server within a physical file system of the second storage device, including making the virtual file server have a same appearance as when previously attached with the first storage device by updating the server identity information, the virtual file server being decoupled from an operating system of the second computing device.

18. The non-transitory, machine-readable medium of claim 17, wherein the virtual file server is migrated by:

replicating blocks of the virtual file server from the first storage device to the second storage device; or migrating the virtual volume set.

19. The non-transitory, machine-readable medium of claim 17, wherein the metadata and authentication information define a configuration of the virtual file server as the virtual file server appears to the operating system of the first computing device.

20. The non-transitory, machine-readable medium of claim 17, wherein one or both of the first storage device and the second storage device comprise a multi-protocol storage array of flash drives that provides block storage over a first protocol, file storage over a second protocol, and object storage over a third protocol.

* * * * *